United States Patent [19]

Krause et al.

[11] Patent Number: 5,730,472

[45] Date of Patent: Mar. 24, 1998

[54] FLANGELESS PIPE JOINT AND A PROCESS FOR MANUFACTURING SUCH A JOINT

[75] Inventors: Brian W. Krause, Midland; Michael F. Jeglic, Auburn; Dennis A. Huggard, Freeland, all of Mich.

[73] Assignee: The Dow Chemical Company, Midland, Mich.

[21] Appl. No.: 632,512

[22] PCT Filed: Oct. 29, 1993

[86] PCT No.: PCT/US93/10427

§ 371 Date: Apr. 19, 1996

§ 102(e) Date: Apr. 19, 1996

[87] PCT Pub. No.: WO95/12086

PCT Pub. Date: May 4, 1995

[51] Int. Cl.$^6$ ............................................. F16L 13/02
[52] U.S. Cl. ....................... 285/21.1; 285/21.2; 285/21.3; 285/55; 285/93; 285/369; 285/382.2; 285/906; 285/915; 29/458; 29/890.14
[58] Field of Search ............................... 285/55, 382.2, 285/915, 369, 93, 906, 21.1, 21.2, 21.3; 29/458, 890.14

[56] References Cited

U.S. PATENT DOCUMENTS

| | | | |
|---|---|---|---|
| 3,047,937 | 8/1962 | Vecchi | 285/55 X |
| 3,498,648 | 3/1970 | Hallesy | 285/382.2 X |
| 3,563,573 | 2/1971 | Crompton | 285/55 |
| 3,606,659 | 9/1971 | Robbins | 285/55 X |
| 4,277,091 | 7/1981 | Hunter | 285/55 |
| 4,295,669 | 10/1981 | LaPrade et al. | 285/93 X |
| 4,614,369 | 9/1986 | Overath | 285/915 X |
| 4,662,655 | 5/1987 | Fliervoet et al. | 285/915 X |

FOREIGN PATENT DOCUMENTS

| | | | |
|---|---|---|---|
| 123687 | 3/1967 | Germany | 285/55 |
| 58843 | 11/1967 | Germany | 285/369 |
| 544155 | 9/1959 | Netherlands | 285/55 |

Primary Examiner—Dave W. Arola

[57] ABSTRACT

A flangeless pipe joint for polymer-lined piping in which the piping is joined by a coupling and the lining is slip, loose, interference or swaged fitted into the pipes and joined at the ends thereof against relative movement.

17 Claims, 2 Drawing Sheets

FLANGELESS PIPE JOINT AND A PROCESS FOR MANUFACTURING SUCH A JOINT

The subject invention pertains to a flangeless pipe joint. The subject invention further pertains to a process for manufacturing a flangeless pipe joint.

Currently available and well known plastic-lined piping products comprise a family of pipes, fittings, and valves especially designed for handling corrosive or high purity liquids. Such products generally comprise steel lined with a polymeric material. Such materials include, but are not limited to polyvinylidene chloride, polypropylene, polyvinylidene fluoride, perfluoroalkoxy copolymer, fluorinated ethylene-propylene copolymer, ethylene trifluoroethylene, ethylchlorotrifluoroethylene, and polytetrafluoroethylene. Such products enjoy both the structural integrity of steel and the high chemical resistance characteristic of the selected polymeric liner.

Typically, each pipe, fitting, valve, etc. will typically contain a flange at or substantially near each end thereof. Adjacent pipes, fittings, valves, etc., within a given pipeline may be joined one to another by the fastening together of such flanges, e.g., by bolting.

While flanged joints are acceptable in most applications, advantage could be had in flangeless joints. Such joints could be constructed to be fluid-proof and vapor-proof, to decrease (if not eliminate) fugitive emissions through the joints. Moreover, such joints would be less bulky than flanged joints, which would make their enclosure within secondary containment systems less unwieldy U.S. Pat. No. 4,780,163 provides a method of sliplining pipe to form a pipeline having flangeless joints. In particular, a section of pipe is cut to form two pieces and a cutout portion, such that the point of the cut forms a closure point. Polymeric liner segments are then drawn through each of the two pieces and extend beyond the ends of the pipe to the closure point. Then, the liner segments are fused at the closure point, the liner segments are insulated at the point of fusion, and the cut out portion is welded to the pieces to form a continuous piece of pipe. The patent requires that a heat shield-insulation material be wrapped around the fused liner segments between the fused liner segments and the cutout portion of the pipe Such heat shield-insulation material may be used due to the relatively large gap that exists between the outer surface of the liner and the inner surface of the pipe segment, characteristic of sliplined pipe.

U.S. Pat. No. 5,127,116 discloses a joint for pipes, each of which contains a polyolefin liner, comprising two pipe end portions spaced apart with their liners protruding from the end portions and joined by joining means (such as electrofusion), a shell interconnecting the pipe end portions, and grout in the space between the liners and the shell. The disclosed joint is disadvantageous, in that the necessity of grout increases the bulk of the joint. The disclosed joint is further disadvantageous, it that is does not have leakage detection capabilities. The disclosed joint is further disadvantageous, in that it does not provide a system wherein the liner is retained between the first and second sections of pipe at the point of the joining means in a manner which restrains linear movement of the liners.

Industry would find advantage in flangeless joints for plastic-lined pipe systems. In particular, the industry would find advantage in flangeless joints for plastic-lined pipe systems, wherein adjacent liners are joined together by joining means other than compressive force, such as to form a fluid- and vapor-tight seal between adjacent liners. Industry would further find advantage in a flangeless joint, wherein the linear movement of a polymeric liners is restrained, such as during thermal cycling. Industry would further find advantage in a flangeless joint equipped with a secondarily contained leak detection zone for detecting leaks in the joining means.

Accordingly, the subject invention provides a flangeless pipe joint for polymer-lined pipe comprising:

(a) a first section of pipe having a first section end, said first section of pipe being lined with a first polymeric liner having a first liner end extending from said first section end;

(b) a second section of pipe having a second section end, said second section of pipe being lined with a second polymeric liner having a second liner end extending from said second section end, (c) joining means for joining the first liner end to the second liner end; and (d) an annular coupling for joining said first section end and said second section end by means other than welding or bolting.

The subject invention further provides a process for preparing a flangeless pipe joint for polymer-lined pipe comprising:

(a) providing a first section of pipe lined with a first polymeric liner having a first liner end and a second section of pipe lined with a second polymeric liner having a second liner end;

(b) removing a portion of said first section to expose a portion of said first polymeric liner and to form a modified first section having a first section end, (c) removing a portion of said second section to expose a portion of said second polymeric liner and to form a modified second section having a second section end;

(d) joining said first liner end and said second liner end; and (e) providing an annular coupling to join said first section end and said second section end by means other than welding or bolting.

In a particularly preferred embodiment, the flangeless joint and the process of the subject invention will create a void between the means for joining the first and second liner ends and the coupling, whereupon leakage detection capabilities are created. In another particularly preferred embodiment, the flangeless joint and the process of the subject invention will create a "locked-in" system, wherein the the liner is retained between the first and second sections of pipe at the point of the joining means in a manner which restrains linear movement of the liners.

These and other features of the invention will be more fully set forth in the following detailed description wherein.

Figure 1:
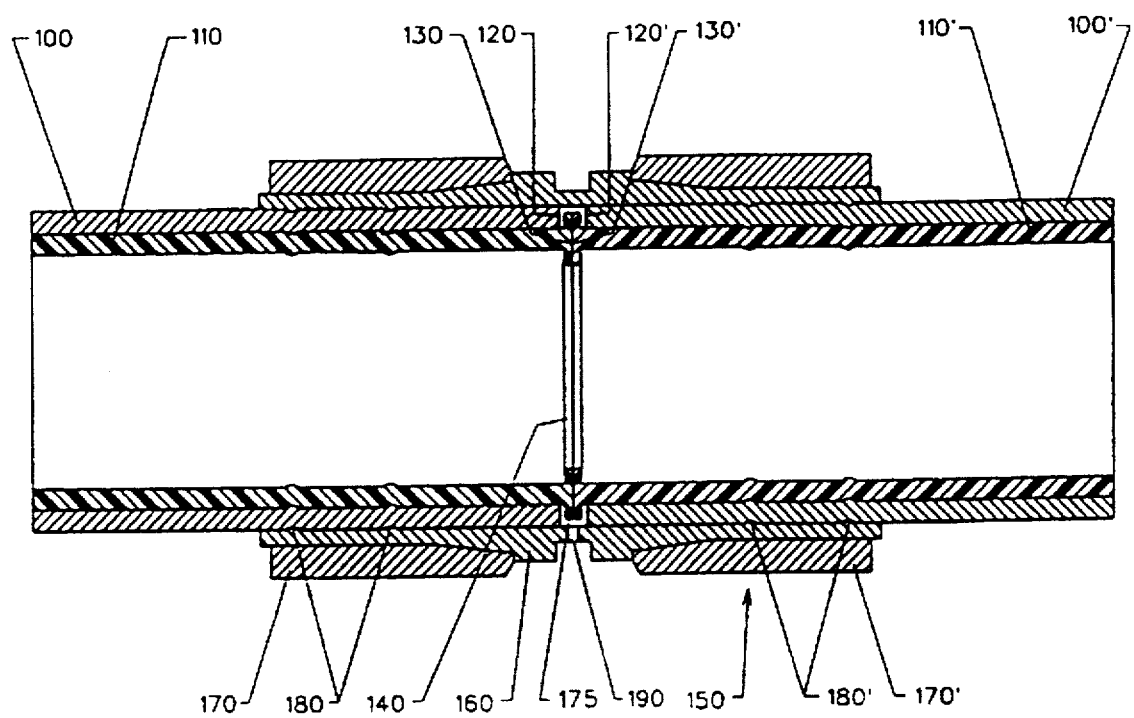
FIG. 1 is a sectional view of a first flangeless polymer-lined pipe joint of the subject invention.

Plastic-lined pipe typically falls into one of two categories: transfer pipe and process pipe. Transfer pipe refers to pipe typically located beneath the ground for the transfer of a material long distances, from one location to another. Transfer pipe is typically prepared by slip lining, wherein a polymeric liner is pulled through an installed pipe and retained within such pipe only at the points of joinder between adjacent pipe segments, each pipe segment being hundreds of feet long. Typically, the outside diameter of the liner is up to about 10 percent less than the inside diameter of the pipe segments, causing a significant gap between the liner and the inner wall of the pipe. As transfer pipe is not typically subjected to thermal cycling conditions and to the extent that high line pressures compress the liner against the inner wall of the pipe, the relatively large gap between the liner and the inner wall of the pipe is not problematic.

Plastic-lined process pipe typically falls into one of three subcategories: loose-lined pipe, interference fit pipe, and swaged pipe. In contrast to transfer pipe, process pipe typically comprises shorter pipe segments, on the order of about forty feet and less. Further, process pipe is typically characterized by an outside liner diameter which is at least about 97 percent of the inside diameter of the pipe segments.

Loose-lined pipe is characterized by a polymeric liner retained within a pipe only at the points of joinder between adjacent pipe segments, wherein the outside liner diameter is at least about 97 percent of the inside diameter of the pipe segment. Loose-lined pipes are typically manufactured by slipping a pre-formed polymeric liner into a flanged pipe segment, flaring the liner over the structurally rigid flange face, and bolting the flange to an adjacent flange. In loose-lined pipe, the liner is thus retained within the pipe segment by the compressive force exerted on the flared portion of the liner at the flange face. Loose-lined pipe is generally sold as its components, e.g., as pipe segments, polymeric liners, and flanges. In the field, the liner may be inserted into the flanged pipe segment, and may be flared as described above. Suppliers for loose-lined pipe components include Crane-Resistoflex Co. (Marion, N.C.), and Performance Plastic Products (Houston, Tex.).

Interference fit pipe, which is also known as reverse swaged pipe, is characterized by a zero tolerance fit between the polymeric liner and the pipe segments. Interference fit plastic-lined pipe is typically formed by compressing a preformed polymeric liner having an outer diameter greater than the inner diameter of the pipe segment by passing it through a sizing die, and inserting the compressed liner into the pipe segment before the liner expands. Upon the release of the force by which the liner is pulled through the pipe, the memory of the plastic causes the liner to exert force upon the inner wall of the pipe segment, serving to assist in retaining the liner within the pipe segment. Due to the special apparatus required to achieve the interference fit relationship, interference fit pipe is generally available as pre-lined pipe segments. Interference fit pipe is sold by Crane-Resistoflex Co. (Marion, N.C.) as Thermal Locked pipe.

Swaged pipe is characterized by a zero tolerance fit between the polymeric liner and the pipe segments. Swaged pipe is typically formed by inserting a preformed polymeric liner into an oversized pipe segment and physically compressing both the pipe and the liner under tremendous pressure such that the liner and the pipe segment are reduced in size to the finished diameters. To further facilitate retention of the liner within the pipe segment, pipe segments to be lined may be "picked" to provide barbs and recessed portions into which the liner is directed during swaging. Due to the special apparatus required to swage pipe, swaged pipe is generally available as pre-lined pipe segments. Swaged pipe is sold by The Dow Chemical Company (Midland, Mich.).

Metal and polymers have different rates of expansion under heat. Swaged pipe, and to some extent interference fit pipe, is advantageous as compared to loose-lined pipe when temperature changes within the piping or when extreme ambient temperatures are encountered. Zero tolerance fit piping systems tend to better retain the liner in close proximity with the metal, thus limiting the extent of expansion and retraction of the liner during temperature cycling. This is particularly true in the case of swaged pipe having the "picked" surface described above, wherein the resultant inner locking secures the liner to the steel pipe segment over the entire length of the pipe segment, thereby evenly distributing the stresses caused by thermal expansion and contraction.

The subject invention provides a flangeless polymer-lined pipe joint useful to join adjacent sections of polymer-lined transfer or process pipe.

In a first embodiment, the subject invention pertains to a flangeless pipe joint, such is as depicted in FIG. 1. As depicted in FIG. 1, first section of pipe 100 and second section of pipe 100' are lined with first polymeric liner 110 and second polymeric liner 110', respectively. First section of pipe 100 has a first section end 120, while second section of pipe 100' has a second section end 120'. First polymeric liner 110 has a first liner end 130, while second polymeric liner 110' has a second liner end 130'. First liner end 130 and second liner end 130' are joined by joining means 140, e.g., a butt fusion or infrared weld, to form a high-integrity pipe joint seal. Coupling 150 connects first section end 120 and second section end 120'. In this embodiment, coupling 150 comprises fitting body 160 and swage rings 170 and 170' which serve to secure fitting body 160 to first section of pipe 100 and second section of pipe 100' through compressive force. Secure retention of coupling 150 onto first section of pipe 100 and second section of pipe 100' is facilitated by circumferential sealing lands 180 and 180', which, upon hydraulic advancement of swage rings 170 and 170' press into first section of pipe 100 and second section pipe 100'. In this embodiment, annular gap 175 exists between fitting body 160 and first liner 120 and second liner 120' at joining means 140. Annular gap 175 provides the flangeless joint with a secondarily contained leak detection zone. Bore 190 connects annular gap 175 with a suitable leak detection device, not shown. In particular, wire leads could be inserted from the leakage detection device, through bore 190, into annular gap 175. To restrain linear movement of first and second polymeric liners 110 and 110', a portion of joining means 140, e.g., a weld bead, extends into annular gap 175. The depicted coupling 150, without bore 190, is commercially available from Lokring Corporation (Foster City, Calif.).

In another embodiment, the subject invention pertains to a process for preparing the flangeless pipe joint depicted in FIG. 1. In such an embodiment, first section of pipe 100 and second section of pipe 100' are lined with first polymeric liner 110 and second polymeric liner 110', respectively. A portion of first section of pipe 100 and of second section of pipe 100' are removed, e.g., by either machining away such portions or by cutting and removing the metal portions, leaving first polymeric liner 110 and second polymeric liner 110' intact. The removal of such portions results in the exposure of first section end 120 and second section end 120'. First liner end 130 and second liner end 130' are joined by joining means 140, e.g., by butt fusion welding, to form a high-integrity pipe joint seal. Preferably, joining means 140 will be such as to form a weld bead large enough to restrain linear movement of first and second polymeric liners 110 and 110'. First section of pipe 100 and second section of pipe 100' are inserted into fitting body 160 of coupling 150. A hydraulic tool advances swage rings 170 and 170' axially over fitting body 160. Simultaneously, swage rings 170 and 170' compress fitting body 160 down onto first section of pipe 100 and second section of pipe 100', causing circumferential sealing lands 180 and 180' machined in fitting body 160 to further press into first section of pipe 100 and second section pipe 100', and thus to further promote secure retention of coupling 160 thereupon. Bore 190 is provided by standard metalworking techniques and extends through fitting body 160 into annular gap 175. Such drilling may occur prior to insertion of first section of pipe 100 and second section of pipe 100' onto coupling 150, or after swage rings 170 and 170' are advanced over fitting body 160. To avoid accidental damage to first polymeric liner 110 and second polymeric liner 110', drilling of bore 190 will preferably occur prior to insertion of first section of pipe 100 and second section of pipe 100'.

Figure 2:
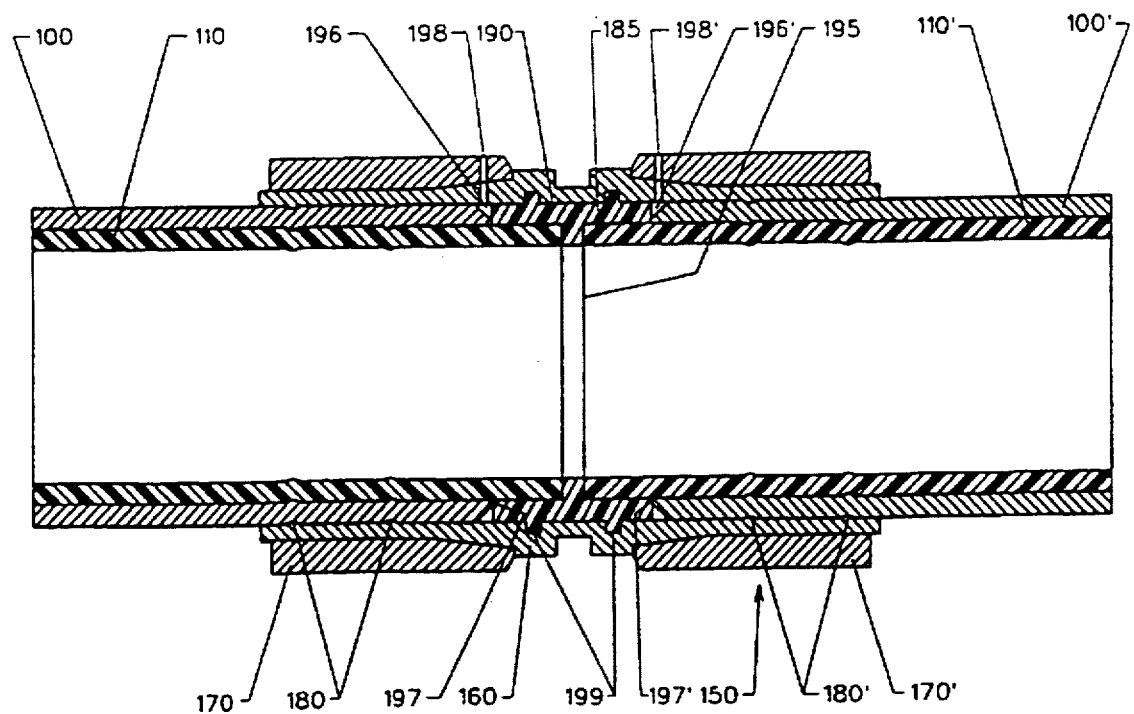
FIG. 2 is a sectional view of a second flangeless polymer-lined pipe joint of the subject invention.

In another embodiment, the subject invention pertains to a flangeless pipe joint, such is as depicted in FIG. 2, and to a process for its preparation. The embodiment of FIG. 2 is similar to that depicted in FIG. 1, excepting that an alternate means for joining first polymeric liner 110 and second polymeric liner 110' is employed. In particular, the joining means of FIG. 2 utilizes a polymeric coupling 185. Polymeric coupling 185 has a first annular portion 190 and a second annular portion 195. First annular portion preferably has a configuration whereupon the inner and outer diameters are approximately equal to the inner and outer diameters of first and second sections of pipe 100 and 100'. Second annular portion preferably has an inner diameter greater than or equal to the inner diameter of first polymeric liner 110 and second polymeric liner 110'. Preferably, the inner diameter of second annular portion 190 will equal the inner diameters of first and second polymeric liners 110 and 110'. First polymeric liner 110 and second polymeric liner 110' are inserted into the respective sides of first annular portion 190, such that the first liner end 130 and second liner end 130' abut against second annular portion 195. Polymeric coupling 185 is joined to first and second polymeric liners 110 and 110' by suitable joinder means, such as socket welding, adhesives, solvent welding, or electrofusion. Annular gaps 196 and 196' are provided as secondarily contained leak detection zones. To restrain linear movement of first polymeric liner 110 and second polymeric liner 110', e.g., during thermal cycling, lands 197 and 197' are provided. Annular gaps 196 and 196' and lands 197 and 197' are produced by chamfering first and second sections of pipe 100 and 100' prior to insertion of the first and second polymeric liners 110 and 110' into polymeric coupling 185. In a preferred embodiment, polymeric coupling 185 will be molded into fitting body 160. First and second sections of pipe are then inserted into coupling 185 as retained within fitting body 160, polymeric liners 110 and 110' are joined, and swage rings 170 and 170' are thereafter compressed to form the completed joint. Optionally, fitting body 160 will be provided with internal annular grooves 199, such that the plastic of polymer coupling 185 fills such grooves during molding. Through bores are provided in fitting body 160, and in swage rings 170 and 170', such that, upon hydraulic advancement of swage rings 170 and 170' onto fitting body 160, the bores align to form bores 198 and 198' which permit communication between a leakage detection device (not shown) and annular gaps 196 and 196', respectively.

Figure 3:
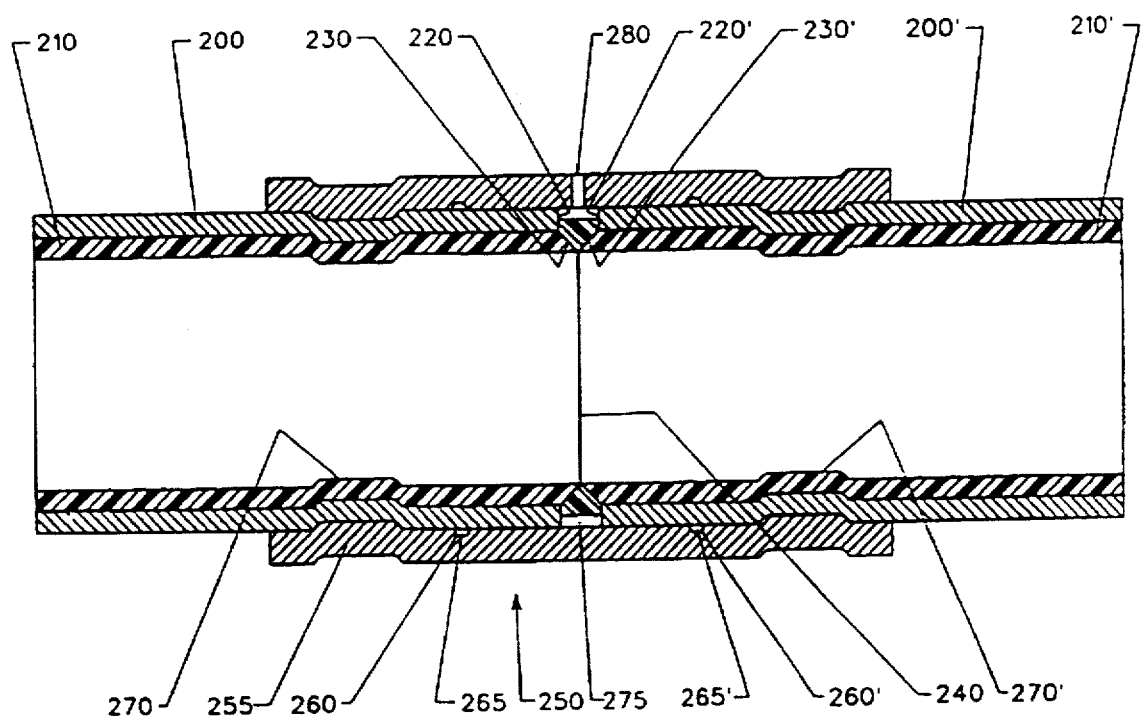
FIG. 3 is a sectional view of a third flangeless polymer-lined pipe joint of the subject invention, wherein common reference numerals refer to common components.

In another embodiment, the subject invention pertains to a flangeless pipe joint, such is as depicted in FIG. 3. As depicted in FIG. 3, first section of pipe 200 and second section of pipe 200' are lined with first polymeric liner 210 and second polymeric liner 210', respectively. First section of pipe 200 has a first section end 220, while second section of pipe 200' has a second section end 220'. First polymeric liner 210 has an optionally beveled first liner end 230, while second polymeric liner 210' has an optionally beveled second liner end 230'. First liner end 230 and second liner end 230' are joined by joining means 240, e.g., a fillet weld, to form a high-integrity pipe joint seal. Coupling 250 connects first section end 220 and second section end 220'. Coupling 250 comprises a housing 255. Housing 255 is equipped with pockets 260 and 260'. Retained within pockets 260 and 260' are polymeric or elastomeric seals 265 and 265', respectively. Housing 255 is compressed onto first section of pipe 200 and second section of pipe 200', whereupon first and second sections of pipe 200 and 200' and first and second polymeric liners 210 and 210' are likewise compressed in annular regions 270 and 270', to promote secure retention of coupling 250 on first section 200 and second section 200'. During such compression, pockets 260 and 260' are likewise compressed, whereupon seals 265 and 265' are compressed to form a fluid-tight seal. In this embodiment, annular gap 275 exists between housing 255 and first liner 220 and second liner 220' at joining means 240, which creates a secondarily contained leak detection zone. Bore 280 connects annular gap 275 with a suitable leakage detection device, not shown. Couplings 250, without bore 280, are commercially available from Deutsch Metal Components (Gardena, Calif.), such as the coupling having the tradename PYPLOK. As depicted in the preferred embodiment of the FIGURE, joining means 240 are such that the outer diameter of first and second polymeric liners 210 and 210', at the point of joining means 240, are greater than the outer diameter of first and second polymeric liners throughout the remainder of their length. Such an expanded fillet weld serves to limit linear movement of the first and second polymeric liners, which becomes important in applications characterized by thermal cycling.

In another embodiment, the subject invention pertains to a process for preparing the flangeless pipe joint depicted in FIG. 3. In such an embodiment, first section of pipe 200 and second section of pipe 200' are lined with first polymeric liner 210 and second polymeric liner 210', respectively. A portion of first section of pipe 200 and of second section of pipe 200' are removed, e.g., by either machining away such portions or by cutting and removing the metal portions, leaving first polymeric liner 210 and second polymeric liner 210' intact. The removal of such portions results in the exposure of first section end 220 and second section end 220'. First polymeric liner 210 and second polymeric liner 220 are optionally beveled to form first liner end 230 and second liner end 230'. Such beveling is preferred when the polymeric liners are to be joined via fillet welding. First liner end 230 and second liner end 230' are joined by joining means 240, e.g., a fillet weld, to form a high-integrity pipe joint seal. Such a fillet weld is formed by melting a rod of plastic such that the plastic flows into the beveled channel formed between first liner end 230 and second liner end 230'. Housing 255 of coupling 250 is slid over first section of pipe 200 and second section of pipe 200'. A hydraulic tool circumferentially and sequentially compresses housing 255 over first section of pipe 200 and second section of pipe 200'. During such compression, housing 255 is compressed onto first section of pipe 200 and second section of pipe 200', whereupon first and second sections of pipe 200 and 200' and first and second polymeric liners 210 and 210' are likewise compressed in annular regions 270 and 270' to promote secure retention of coupling 250 on first section 200 and second section 200'. During such compression, pockets 260 and 260' are likewise compressed, whereupon seals 265 and 265' are compressed to form a fluid-tight seal. Bore 280 is drilled through housing 255 into annular gap 275. Such drilling may occur prior to insertion of first section of pipe 200 and second section of pipe 200' into coupling 250, or after compression of housing 255 onto first and second sections of pipe 200 and 200'.

Additional couplings will be suitable to join the first and second sections of pipe. For instance, a coupling available from Advanced Metal Components, Inc. (Menlo Park, Calif.), having the tradename CRYOFIT, may likewise be employed. Such couplings are cylindrical in configuration, and have raised circumferential ridges formed within the bore of the coupling. Such couplings are fabricated of a nickel/titanium alloy and have been machined with an inner diameter approximately three percent less than the outer diameter of the first and second sections of pipe to be joined. Upon insertion into liquid nitrogen, at a temperature of −325° F. (−195° C.), the alloy is rendered ductile. A sizing mandrel is hydraulically pushed through the bore of the coupling to result in a coupling having an inner diameter approximately five percent larger than the outer diameter of the first and second sections of pipe to be joined. The coupling is removed from the liquid nitrogen, and is slid into place over the pipe segments at the point at which the first and second polymeric liners have been previously joined. As the temperature of the coupling increases, the coupling contracts in a radially inward manner, applying great pressure to the first and second sections of pipe, causing the coupling, and, in particular, the raised circumferential ridges of the coupling, to press into the first and second sections of pipe, bulging the metal and liner of the pipe sections radially inwardly.

As depicted in the above FIGURES, and in accordance with means known in the art, adjacent polymeric liner ends are joined. Such means include, but are not limited to, e.g., butt fusion welds, infrared welds, fillet welds, socket welds, solvent welds, ultrasonic welds, vibratory welds, electrofusion, and adhesives. Depending upon the type of joinder means employed, it may be advantageous to trim the liner ends to form more uniform joining surfaces and/or to reduce the degree to which the liner extends past the end of the first or second section end.

One particularly preferred joining means is butt fusion welding. A suitable apparatus for butt fusion welding adjacent polymeric liners is described in U.S. Pat. No. 4,352,708, the relevant portions of which are incorporated herein by reference. Another suitable apparatus for butt fusion welding adjacent polymeric liners is available from Omicron, S.N.C (Caselle Di Selvazzano, Italy).

In an exemplary butt fusion welding process for polyvinylidene fluoride liners, adjacent liner ends are pressed against a hot plate at a temperature of 210° C. with a combined pressure of 10 psi (70 kilopascals) until a 1/32 inch (0.08 cm) bead forms on the outer circumference of the joint. The pressure is then reduced to 1 psi (6 kilopascals) for an additional 45 seconds. Then, the plate is removed by backing the adjacent liner ends away and pulling out the plate. The two heated partially melted adjacent liner ends are quickly pushed together at a pressure of 10 psi (70 kilopascals) and held together at that pressure for 20 minutes.

Another particularly preferred joining means is infrared welding. Infrared welding differs from butt fusion welding in that in the former, heat is transferred to the adjacent polymeric liner ends by radiation only. Such joining means are particularly applicable to fluoropolymers, such as perfluoroalkoxy copolymer, which may be adversely affected by direct contact with a hot plate, as employed in conventional butt fusion welding. One supplier of infrared welding equipment is Georg Fisher Piping Systems (Schaffhausen, Switzerland).

Another particularly preferred joining means is fillet welding, wherein a thermoplastic filler rod is heated and the flowing material is applied to the liner ends to join them. Optionally, the liner ends will be beveled such that when they are brought together, a V-shaped annular channel is formed, the point of the V lying at the inner surface of the liner at the point of joinder. The fillet weld will be made within the V along the bevels, such that the weld bead contacts more surface area of the liner ends than if the filler rod was merely passed over the outer circumference of straight-cut liner ends.

Another particularly preferred joining means is electrofusion, wherein a polymeric coupling, such as is depicted in FIG. 2 is employed. In such an embodiment, the polymeric coupling is equipped with a heating element, by which is can be heated and caused to fuse itself and the first and second polymeric liners to which it bonds.

While the subject invention has been described in terms of plastic-lined pipe segments, it will be recognized that the invention further applies to injection molded pipe fittings, such as ells, tees, wyes, etc. In this case, the term "first section of pipe" and/or "second section of pipe" will include linear sections of pipe, as well as, e.g., fittings. Due to their typically nonlinear configurations, fittings are typically formed by turning individual units and joining the turned units to form the desired configuration, e.g., by welding. Thus, two units are joined to form elbows, three units are joined to form both tees and wyes, and four units are joined to form crosses. Once joined, one or more dies are inserted into the fitting. The fitting is then lined by injecting the liner material into the region defined by the interior surface of the fitting and the die(s).

Moreover, the subject invention has been described such that the pipe segment in question is pre-lined, whereupon a portion of the pre-lined pipe segment is subsequently removed to expose a portion of the polymeric liner and to create the first and second section ends. However, in the case of looselined, sliplined and interference fit pipe segments, the liner may be pulled through the pipe section such that it extends therefrom, without sacrificing the benefits of the subject invention.

Other embodiments of the invention described above will be readily apparent to those having skill in the art. Accordingly, the scope of the invention shall be limited only by the claims appended hereto.

We claim:

1. In a flangeless pipe joint for polymer-lined pipe having
   (a) a first section of pipe (100) having a first section end (120), said first section of pipe being lined with a first polymeric liner (110) having a first liner end (130) extending from said first section end;
   (b) a second section of pipe (100') having a second section end (120'), said second section of pipe being lined with a second polymeric liner (110') having a second liner end (130') extending from said second section end;
   (c) joining means (140) for joining the first liner end to the second liner end, said joining means serving to restrain linear movement of said first polymeric liner and said second polymeric liner; and
   (d) an annular metallic coupling (150) for joining said first section end and said second section end, characterized in that the annular coupling comprises a mechanical coupling retained on said first section of pipe and said second section of pipe by compressive force.

2. The flangeless pipe joint of claim 1 wherein said polymeric liner is a polymer selected from the group consisting of polyvinylidene fluoride, polypropylene, polyvinylidene chloride, polytetrafluoroethylene, perfluoroalkoxy copolymer, and fluorinated ethylene-propylene copolymer.

3. The flangeless pipe joint of claim 1, wherein the first polymeric liner is positioned in the first section of pipe by a method selected from the group consisting of slip-lined, interference fit, swaged, and loose-lined and the second polymeric liner is positioned in the second section of pipe by a method selected from the group consisting of slip-lined, interference fit, swaged, and loose-lined.

4. The flangeless pipe joint of claim 1, wherein said joining means comprises a weld bead.

5. The flangeless pipe joint of claim 1, wherein the first joining means comprises a polymeric coupling inserted between the first polymeric liner end and the second polymeric liner end, the polymeric coupling further comprising an annular sleeve which wraps around the first polymer liner and the second polymeric liner.

6. The flangeless pipe joint of claim 1, further comprising:

(e) a secondarily contained leak detection zone.

7. The flangeless pipe joint of claim 6, wherein said secondarily contained leak detection zone comprises an annular gap between said joining means of step (c) and said annular coupling.

8. The flangeless pipe joint of claim 6, further comprising:

(f) means operationally connected to said secondarily contained leak detection zone to permit detection of leaks in said joining means of step (c).

9. A process for preparing a flangeless pipe joint for polymer-lined pipe comprising:

(a) providing a first section of pipe (100) lined with a first polymeric liner (110) having a first liner end (130) and a second section of pipe (100') lined with a second polymeric liner (110') having a second liner end (130');

(b) removing a portion of said first section to expose an annular portion of said first polymeric liner and to form a modified first section having a first section end;

(c) removing a portion of said second section to expose an annular portion of said second polymeric liner and to form a modified second section having a second section end;

(d) joining said first liner end and said second liner end with joining means (140), said joining means serving to restrain linear movement of said first polymeric liner and said second polymeric liner; and (e) providing an annular metallic coupling (150) to join said first section end and said second section end wherein the annular coupling comprises a mechanical coupling which is compressed onto said first section of pipe and said section of pipe such that said first section of pipe and said second section of pipe are decreased in diameter at the points of said compressing.

10. The process of claim 9, wherein the first or the second polymeric liner is a polymer selected from the group consisting of polyvinylidene fluoride, polypropylene, polyvinylidene chloride, polytetrafluoroethylene, perfluoroalkoxy copolymer, and fluorinated ethylene-propylene copolymer.

11. The process of claim 9, wherein the first polymeric liner is positioned in the second section of pipe by a method selected from the group consisting of slip-lined, interference fit, swaged, or loose-lined into the first section of pipe and the second polymeric liner is slip-lined, interference fit, swaged, and loose-lined.

12. The process of claim 9, wherein said joining comprises welding or fusing said first polymeric liner end to said second polymeric liner end.

13. The process of claim 9, wherein said joining comprises inserting a polymeric coupling between said first polymeric liner end and said second polymeric liner end, said polymeric coupling further comprising an annular sleeve which wraps around said first polymer liner and said second polymeric liner, and joining said polymeric coupling to said first polymeric liner and said second polymeric liner.

14. The process of claim 13, wherein said polymeric coupling is joined to said first polymeric liner and said second polymeric liner by socket welding, adhesives, solvent welding, and electrofusion.

15. The process of claim 9, wherein a secondarily contained leak detection zone is formed between said joining means and said annular coupling.

16. The process of claim 15, wherein said secondarily contained leak detection zone comprises an annular gap between said joining means of step (d) and said annular coupling.

17. The process of claim 15, further comprising:

(f) providing means operationally connected to said secondarily contained leak detection zone to permit detection of leaks in said joining means of step (d).

* * * * *